United States Patent Office 3,377,188
Patented Apr. 9, 1968

3,377,188
METHOD FOR PAINTING WAX SURFACES
Robert P. Zmitrovis, Freehold, N.J., assignor to Cities Service Oil Company, Bartlesville, Okla., a corporation of Delaware
No Drawing. Filed Apr. 6, 1965, Ser. No. 446,112
11 Claims. (Cl. 117—47)

This invention relates to a method for rendering wax surfaces susceptible to painting with a water-base paint.

It has heretofore been generally infeasible to apply a uniform film of water-base paint to a wax surface, for instance a surface of a molded wax object. Either the paint could not be spread at all on the wax surface, or the film developed was characterized by surface defects such as "fisheyes" or "cratering."

It is therefore the primary object of the present invention to provide a method for rendering a wax surface susceptible to painting with a water-base paint, whereby a uniform paint film may be applied to the wax surface.

It is a further object of the invention to render a paraffin wax surface susceptible to painting with a water-base paint.

Various other objects and advantages of the invention will become apparent from the following detailed description thereof.

Briefly, in accordance with the present invention, the painting of a wax surface with a water-base paint is carried out in the presence of a suitable amount of a liquid, water soluble polyethylene glycol phosphoric acid ester of the non-ionic type. Besides enabling the water-base paint to be spread uniformly on the wax surface, the polyethylene glycol phosphoric acid esters used in the practice of this invention do not bleach or otherwise deleteriously alter the color of the paint film developed. The term "water-base paint" as used herein is intended to include aqueous solutions or suspensions of a pigment, as well as water colors, i.e. a semi-fluid or solid mixture of water, pigment and suitable binder material such as gum arabic.

The present invention may be used with advantage to render the surface of any wax susceptible to water-base painting, particularly those having an oil content of less than about 10 percent. Thus, for instance, the wax may be a petroleum hydrocarbon wax, i.e., paraffin wax and microcrystalline wax, or a natural wax such as carnauba, palm wax, beeswax, etc. However, paraffin wax is preferred from the standpoint that it can be cast molded. Thus, the invention has particular utility in the decorating of cast molded paraffin wax objects such as children's toys. It will be understood that the term "paraffin wax" as used herein refers to paraffin wax alone or paraffin wax compositions containing various additives, including microcrystalline wax, polyethylene, ethylene-vinyl acetate copolymer, etc. A particularly suitable paraffin wax composition for cast molding purposes comprises a major proportion of paraffin wax and from about 1% to 10% by weight of microcrystalline wax and desirably a small amount, e.g. 2%, of ethylene-vinyl acetate copolymer.

The water soluble liquid polyethylene glycol phosphoric acid esters used in the practice of the invention are preferably the non-ionic alkylated phosphoric acid esters of polyethylene glycol, particularly those having a molecular weight of from about 200 to about 600, and preferably from about 250 to about 500. The alkyl groups contained in the alkylated phosphoric acid ester of polyethylene glycol may be an alkyl group containing from 1 to about 10 carbon atoms, although the branch chain alkyl groups, particularly isopropyl, are preferred.

In the practice of the invention, the painting of wax surfaces with a water-base paint is carried out in the presence of a sufficient amount of phosphoric acid ester of polyethylene glycol to enable the water-base paint to be spread uniformly on the surface of the wax. For instance, the phosphoric acid ester of polyethylene glycol may be applied directly to the surface of the wax, or an aqueous solution containing at least about 1%, by weight, and preferably at least 2%, by weight, of a phosphoric acid ester of polyethylene glycol may be prepared and uniformly applied to the wax surface prior to painting thereon. When the latter procedure is employed, it is generally not necessary to use an aqueous solution containing more than about 6%, by weight, of the phosphoric acid ester of polyethylene glycol. Alternatively, a phosphoric acid ester of polyethylene glycol may be mixed with the water-base paint in an amount of at least 0.1%, by weight, of the paint. In accordance with this procedure, concentrations greater than about 2%, by weight, of the paint are generally not necessary, although such greater concentrations have not been found to be deleterious. Various other procedures may also be employed, such as applying to the surface of the wax a solution of a phosphoric acid ester of polyethylene glycol in a readily vaporizable organic solvent such as acetone.

The invention will now be further described in reference to the following specific illustrations which are not to be interpreted as limitative:

EXAMPLE 1

A molded object was prepared from a fully refined paraffin wax having a melting point of 138° F., a needle penetration of 13 decimillimeters at 77° F., and an oil content of less than 0.2%. The surface of the wax object was evenly coated with an isopropylated phosphoric acid ester of polyethylene glycol having a molecular weight, determined by freezing point, of approximately 380. The coated paraffin wax surface was then painted with red, blue and yellow water colors. The paint spread easily on the wax surface forming a uniform film free from fisheyes or cratering.

It was also observed that the pretreatment of the wax surface with the isopropylated phosphoric acid ester of polyethylene glycol did not bleach or otherwise alter the color of the paint film.

EXAMPLE 2

In a manner similar to Example 1, molded paraffin wax objects were uniformly coated with aqueous solutions containing 2%, 5% and 10%, respectively, of an isopropylated phosphoric acid ester of polyethylene glycol. The wax objects so coated were allowed to dry and were then painted with a water color. Uniform, bright paint films were developed in all cases.

EXAMPLE 3

Isopropylated phosphoric acid ester of polyethylene glycol was admixed with an aqueous yellow paint in concentrations of 0.1% and 1%, respectively, by weight of the paint. The paint compositions so prepared were applied to molded paraffin wax objects. Uniform bright yellow paint films were developed in both cases.

It will be understood that various changes and modifications in the details herein described and illustrated in order to explain the nature of the invention may be made by those skilled in the art within the principle and scope of the invention as expressed in the appended claims.

Therefore, I claim:

1. Method of painting on wax surfaces with a water-base paint which comprises carrying out said painting in the presence of a non-ionic, water soluble phosphoric acid ester of polyethylene glycol in an amount sufficient to enable said water-base paint to be spread uniformly on a wax surface.

2. Method as in claim 1 wherein an aqueous solution containing at least about 1% by weight of said phosphoric acid ester of polyethylene glycol is uniformly coated on said wax surface prior to painting thereon.

3. Method as in claim 1 wherein said phosphoric acid ester of polyethylene glycol is admixed with said water-base paint in an amount of at least about 0.1% by weight of the paint prior to painting on said wax surface.

4. Method of claim 1 wherein said wax has an oil content of less than about 10 percent.

5. Method as in claim 1 wherein said wax comprises at least a major amount of paraffin wax.

6. Method of painting on wax surfaces with a water-base paint which comprises carrying out said painting in the presence of a non-ionic, water soluble alkylated phosphoric acid ester of polyethylene glycol in an amount sufficient to enable said water-base paint to be spread uniformly on the wax surface.

7. Method as in claim 6 wherein said alkylated phosphoric acid ester of polyethylene glycol has a molecular weight of from about 200 to about 600.

8. Method as in claim 7 wherein said molecular weight is from about 250 to about 500.

9. Method as in claim 6 wherein the alkyl group contained in said alkylated phosphoric acid ester of polyethylene glycol contains from 1 to about 10 carbon atoms.

10. Method as in claim 9 wherein said alkyl group is a branched chain alkyl group.

11. Method as in claim 10, wherein said branched chain alkyl group is isopropyl.

References Cited

UNITED STATES PATENTS

| | | | |
|---|---|---|---|
| 2,720,099 | 10/1955 | Gronowski | 67—22.5 |
| 2,817,225 | 12/1957 | Weglin | 161—234 |

OTHER REFERENCES

Surface Active Agents, Schwartz-Perry, 1949, Interscience Pub. Co., N.Y., pp. 209 and 210.

MURRAY KATZ, *Primary Examiner.*